United States Patent [19]

Clarke

[11] 4,400,023

[45] Aug. 23, 1983

[54] SUSPENSION UNIT FOR A POWER TOOL

[75] Inventor: Robert S. Clarke, Arnott, England

[73] Assignee: Lucas Industries Limited, Birmingham, England

[21] Appl. No.: 283,621

[22] Filed: Jul. 15, 1981

[30] Foreign Application Priority Data

Aug. 29, 1980 [GB] United Kingdom ................. 8028011

[51] Int. Cl.³ ......................... F16L 39/04; F16L 27/00

[52] U.S. Cl. .................................... 285/302; 285/189; 248/333; 248/52

[58] Field of Search ........................ 285/302, 189, 190; 248/51, 52, 323, 333, 334.1, 336, 341, 610

[56] References Cited

U.S. PATENT DOCUMENTS

| | | | |
|---|---|---|---|
| 634,464 | 10/1899 | Kent | 248/323 |
| 971,899 | 10/1910 | Kennedy | 248/336 |
| 3,211,473 | 10/1965 | Schmid | 248/52 X |
| 3,666,220 | 5/1972 | Rider | 248/52 |
| 4,289,292 | 9/1981 | Kunjumon | 248/334.1 X |

*Primary Examiner*—Richard J. Scanlan, Jr.

[57] ABSTRACT

A suspension unit for a power tool comprises a pair of telescopically engaged members and a spring unit acting between the members to draw one member within the other. The member is provided with a support bracket whereby it can be hung from a support in use and the member is adapted to support the power tool. Means in the form of a lateral peg mounted upon a movable guide block to which the member is secured, and a slot through which the peg extends, acts to prevent relative rotation of the members. In this way any reaction torque developed on the power tool will be transmitted to and resisted by the support.

5 Claims, 2 Drawing Figures

SUSPENSION UNIT FOR A POWER TOOL

This invention relates to a suspension unit for a power tool of the kind which comprises a drive unit including a motor, the drive unit having a rotary output member on which in use, is mounted a tool, the suspension unit in use being attached to a support above the location where the power tool is to be used, to support the power tool, but at the same time allowing the power tool to be moved by an operator to a position where the tool can be engaged with a component to be rotated.

Such power tools are widely used in industry when for example it is necessary to turn a component such as a nut during an assembly process. The motor is often in the form of a compressed air motor and in use the tool is engaged with the nut and the motor operated to tighten the nut. When the nut is running freely on the threaded component little torque is exerted. However, when the nut engages an abutment surface the torque exerted is suddenly increased to a value which may be predetermined either by a suitable clutch or by the fact that the motor stalls. The torque reaction has to be resisted by the operator of the power tool since the suspension units employed in the known forms of power tool have been incapable of absorbing any torque. Many times in a working day therefore the operator is called upon to resist the reaction torque which of course is suddenly applied and therefore jars the wrists of the operator.

The object of the present invention is to provide a suspension unit for a power tool in an improved form.

According to the invention a suspension unit for a power tool incorporates a telescopic unit capable of transmitting any reaction torque applied to the power tool in use, to the aforesaid support.

Figure 1:
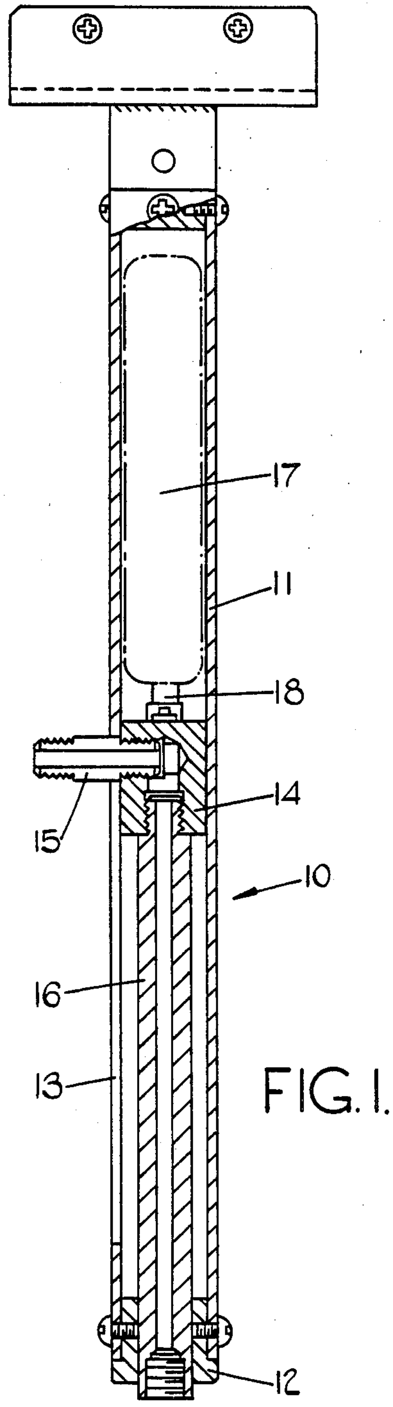
Figure 2:
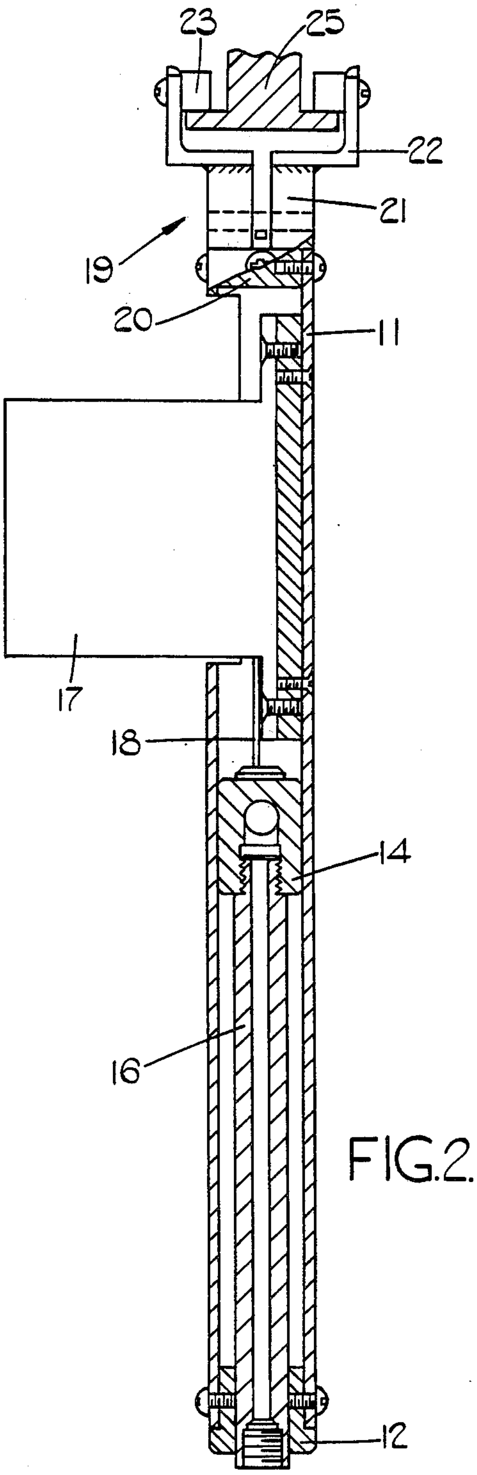

An example of a suspension unit for a power tool will now be described with reference to the accompanying drawings in which FIGS. 1 and 2 are part sectional side elevations take at right angles.

The power tool not shown, comprises a drive unit which includes an air driven motor which drives a rotary output member upon which in use is mounted a tool appropriate to the component to be rotated. In the case of a nut the tool will be in the form of a socket spanner whilst if the component is a screw the tool will be in the form of a blade. The drive unit may be provided with a torque limiting clutch in order to limit the torque which can be applied to the component, alternatively, the motor may be allowed to stall at a predetermined torque. The motor unit includes a screw threaded connector which besides serving as a support for the power tool also defines an air passage for the supply of compressed air to the motor.

The drawings show the suspension unit generally indicated at 10 and comprising an outer tubular member 11 in the lower end of the which is secured a guide block 12. In the wall of the lower portion of the tubular member 11 is formed an elongated slot 13 and located within the tubular member is a further guide block 14 which has a lateral peg in the form of an inlet union 15 secured thereto and which extends through the slot 13 for connection in use to a flexible air supply line.

The further guide block 14 carries an inner tubular member 16 which is slidably mounted in the guide block 12 and which at its lower end, has a threaded recess to receive the connector on the drive unit.

The outer tubular member 11 carries a spring unit 17 which has a spring end 18 extending therefrom and connected to the further guide block 14. The spring unit is able to maintain the members 11 and 16 in the position shown even when the drive unit is secured to the member 16. As will be seen the spring unit extends through a further slot in the upper portion of the outer tubular member 11. A suitable spring unit can be obtained from Tensator Limited of Tickford St., Newport Pagnell, Buckinghamshire, England.

At its upper end, the outer tubular member is secured to a supporting bracket generally indicated at 19 and conveniently this bracket includes a cylindrical portion 20 which is located within the tubular member 11 and is secured thereto by screws. The portion 20 has a pair of upstanding plates 21 secured thereto and at their upper ends, the plates carry angle sections 22. The vertical portions of the two angle sections each carry a pair of spaced pads 23. These pads engage the upper surfaces of a support structure 25 afixed above the place of work.

In use, when the operator requires to tighten a screw or nut, he or she grasps the drive unit to move it downwardly to engage a socket with the nut and such movement is permitted by the fact that the members 11 and 16 move relative to each other, the spring 17 being extended in this process. When the nut is properly engaged the air motor is energised and the nut runs along the screw. When the nut engages an abutment then the reaction torque which is imparted to the drive unit is transmitted by way of the member 16, the pipe union 15 and the member 11 and the support bracket to the supporting structure 25 and the operator will not be required to resist this reaction torque. Use of the power tool therefore requires less effort on the part of the operator and operator fatigue is reduced.

I claim:

1. A suspension unit for a power tool comprising first and second members telescopically engaged one within the other, air supply means for said tool and for resisting relative rotation of said members, a spring unit acting between the members to draw the one member within the other, a supporting bracket secured to the other member whereby the suspension unit in use can be hung from a support, and means on the one member whereby a power tool can be secured thereto.

2. A suspension unit according to claim 1 in which said one member is of tubular form, the unit including a guide block slidable within the other member, said one member being in screw thread engagement with the guide block, the means resisting relative rotation of the members comprising a longitudinal slot formed in the other member and a lateral peg secured to said guide block and extending through said slot.

3. A suspension unit according to claim 2 including a further guide block fixed in the end of said other member remote from said supporting bracket.

4. A suspension unit for a power tool comprising a first member of tubular form, a second member, said members being telescopically engaged one within the other, a guide block slidable within the second member, said first member being in screw thread engagement with the guide block, means for resisting relative rotation of said members comprising a longitudinal slot formed in the second member and a lateral peg secured to said guide block and extending through said slot, said first member, said guide block and said lateral peg, defining an air passage for the supply of air under pressure to the power tool, a spring unit acting between the members to draw the first member within the second member, a supporting bracket secured to the second member, whereby the suspension unit in use can be hung from a support, and means on the first member, whereby a power tool can be secured thereto.

5. A suspension unit for a power tool comprising a first member of tubular form, a second member, said members being telescopically engaged one within the other, a guide block slidable within the second member, said first member being in screw thread engagement with the guide block, means for resisting relative rotation of said members comprising a longitudinal slot formed in the second member and a lateral peg secured to said guide block and extending through said slot, a spring unit acting between the members to draw the first member within the second member, said spring unit being secured to the second member and extending through a further slot defined in the wall of the second member, the spring end of said spring unit being secured to said guide block, a supporting bracket secured to the second member, whereby the suspension unit in use can be hung from a support, and means on the first member, whereby a power tool can be secured thereto.

* * * * *